(12) United States Patent
Sayyadi et al.

(10) Patent No.: US 12,505,109 B2
(45) Date of Patent: Dec. 23, 2025

(54) METHODS AND SYSTEMS FOR SEARCHING FOR CONTENT ITEMS

(71) Applicant: Comcast Cable Communications, LLC, Philadelphia, PA (US)

(72) Inventors: Hans Sayyadi, Philadelphia, PA (US); Praveenkumar Vankireddy, Philadelphia, PA (US); Srikanth Kallurkar, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 482 days.

(21) Appl. No.: 15/079,915

(22) Filed: Mar. 24, 2016

(65) Prior Publication Data

US 2017/0031916 A1   Feb. 2, 2017

Related U.S. Application Data

(60) Provisional application No. 62/199,701, filed on Jul. 31, 2015.

(51) Int. Cl.
| | |
|---|---|
| *G06F 16/00* | (2019.01) |
| *G06F 16/242* | (2019.01) |
| *G06F 16/2457* | (2019.01) |
| *G06F 16/28* | (2019.01) |
| *G06F 16/3332* | (2025.01) |
| *G06F 16/335* | (2019.01) |

(52) U.S. Cl.
CPC ...... *G06F 16/24578* (2019.01); *G06F 16/243* (2019.01); *G06F 16/288* (2019.01); *G06F 16/3334* (2019.01); *G06F 16/335* (2019.01)

(58) Field of Classification Search
CPC .......... G06F 17/3053; G06F 17/20401; G06F 17/30604; G06F 17/30663; G06F 17/30699; G06F 16/24578; G06F 16/243; G06F 16/288
USPC ....................................................... 707/728
See application file for complete search history.

(56) References Cited

U.S. PATENT DOCUMENTS

| | | | |
|---|---|---|---|
| 8,407,230 B2 * | 3/2013 | Slaney | G06F 16/24578 707/748 |
| 8,533,223 B2 * | 9/2013 | Houghton | G06F 40/284 707/776 |
| 9,727,566 B2 * | 8/2017 | Ng | G06F 17/30044 |
| 2002/0042923 A1 * | 4/2002 | Asmussen | H04N 21/6543 348/E5.103 |
| 2005/0165782 A1 * | 7/2005 | Yamamoto | G06F 16/40 |

(Continued)

*Primary Examiner* — Monica M Pyo
(74) *Attorney, Agent, or Firm* — Ballard Spahr LLP

(57) ABSTRACT

Methods and systems for performing a search are disclosed. An example method can comprise a server receiving a search query, wherein the search query comprises one or more keywords. The server can determine a first score indicating importance of a search term to one or more content items associated with a corpus. The server can receive past searches, each comprising a search term and a selected result, and determine a second score indicating importance of a search term to one or more of the content items based on the past searches. The server can determine a third score indicating an importance of each content item to the one or more keywords based on the first score and the second score. One or more of the plurality of content items can be sent to a user based on the third score.

12 Claims, 6 Drawing Sheets

(56) References Cited

U.S. PATENT DOCUMENTS

| | | | |
|---|---|---|---|
| 2007/0027864 A1* | 2/2007 | Collins | G06F 16/36 707/999.005 |
| 2008/0028036 A1* | 1/2008 | Slawson | G06F 17/30867 709/217 |
| 2008/0109285 A1* | 5/2008 | Reuther | G06Q 30/0242 707/999.005 |
| 2009/0234808 A1* | 9/2009 | Zarzar | G06F 16/951 |
| 2009/0282023 A1* | 11/2009 | Bennett | G06F 16/3326 707/999.005 |
| 2009/0313234 A1* | 12/2009 | Takata | H04N 21/4828 707/999.005 |
| 2010/0287033 A1* | 11/2010 | Mathur | G06F 16/9535 705/319 |
| 2010/0306249 A1* | 12/2010 | Hill | G06F 17/30867 707/769 |
| 2011/0296463 A1* | 12/2011 | Suslov | H04N 21/4755 725/44 |
| 2012/0159543 A1* | 6/2012 | Jin | H04N 21/25841 725/39 |
| 2012/0185473 A1* | 7/2012 | Ponting | G06F 16/95 707/728 |
| 2012/0192227 A1* | 7/2012 | Fleischman | H04N 21/8126 725/34 |
| 2013/0054589 A1* | 2/2013 | Cheslow | G06F 16/3344 707/E17.014 |
| 2013/0103634 A1* | 4/2013 | Jojic | G06Q 30/02 706/52 |
| 2013/0144750 A1* | 6/2013 | Brown | G06Q 30/0277 705/26.7 |
| 2014/0046976 A1* | 2/2014 | Zhang | G06F 16/00 707/772 |
| 2014/0074925 A1* | 3/2014 | Budin | G06Q 10/107 709/204 |
| 2014/0075464 A1* | 3/2014 | McCrea | G16H 40/67 725/14 |
| 2014/0181098 A1* | 6/2014 | Bhandari | G06F 16/90332 707/728 |
| 2014/0304261 A1* | 10/2014 | Kritt | G06F 16/338 707/728 |
| 2015/0089368 A1* | 3/2015 | Lester | G06F 16/61 715/716 |
| 2016/0142774 A1* | 5/2016 | Sayyadi-Harikandehei | H04N 21/4668 725/14 |

* cited by examiner

METHODS AND SYSTEMS FOR SEARCHING FOR CONTENT ITEMS

CROSS REFERENCE TO RELATED PATENT APPLICATION

This application claims priority to U.S. Provisional Application No. 62/199,701 filed Jul. 31, 2015, herein incorporated by reference in its entirety.

BACKGROUND

Content or service providers can provide access to a plurality of content items (a "corpus"). Searching within the corpus to locate a particular content item can be difficult for users. Typically, a user can provide a search term, and the search tem is evaluated for each of the content items in the corpus. The evaluation is generally proportional to a number of times that the search term appears within a particular content item in the corpus. However, when the descriptors of content items of a corpus are short (e.g., movie and/or television show titles), standard evaluation techniques are difficult and do not provide significant differentiation between items in the corpus. Thus, the standard evaluation techniques do not always provide meaningful results. These and other difficulties are addressed in the following description.

SUMMARY

It is to be understood that both the following general description and the following detailed description are exemplary and explanatory only and are not restrictive. Methods and systems for performing a search are described herein.

A content or service provider can provide access to a corpus comprising a plurality of content items. A user can search the corpus for content relevant to a particular term by entering a query or search term. One or more of the content items can be returned (e.g., suggested) to a user for consumption based on the provided query. In an aspect, the one or more returned content items can be ordered based on a final relevance score associated with each of the plurality of content items associated with the corpus. For example, one or more factors can contribute to the final relevance score for each of the content items returned in a search: how well the search term matches the content item, how popular the content item is during a current time period, and how relevant the content item is to the user submitting the search term.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
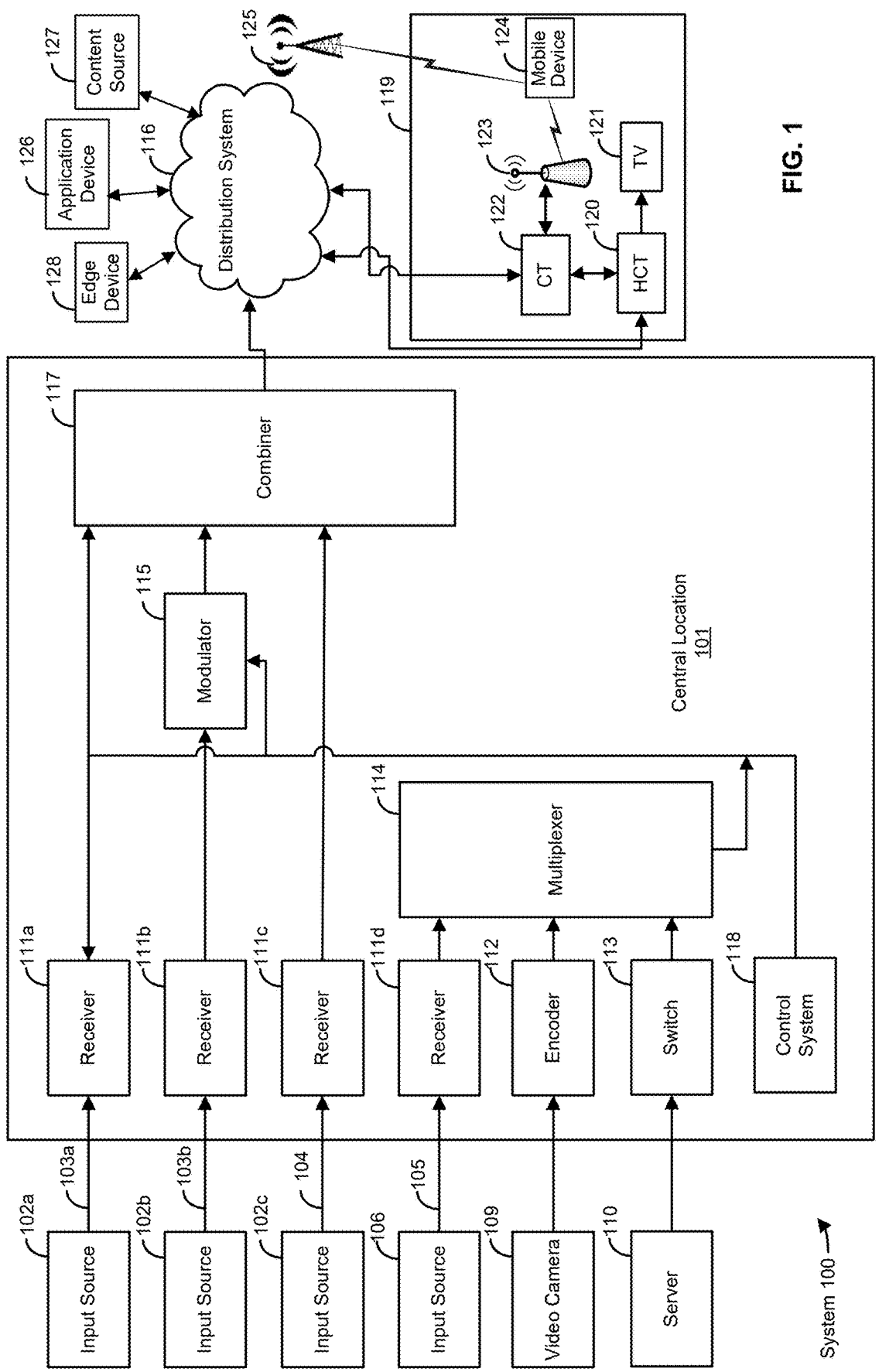
FIG. 1 is a block diagram illustrating various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

A content or service provider can provide access to a corpus comprising a plurality of content items. A user can search the corpus for content relevant to a particular term by entering a query or search term. One or more of the content items can be returned (e.g., suggested) to a user for consumption based on the provided query. In an aspect, the one or more returned content items can be ordered based on a final relevance score associated with each of the plurality of content items associated with the corpus. For example, one or more factors can contribute to the final relevance score for each of the content items returned in a search: how well the search term matches the content item, how popular the content item is during a current time period, and how relevant the content item is to the user submitting the search term.

How well the search term matches the content item can be determined by creating one or more heuristics (e.g., rules) to specify the importance of each word in a search term. For example, heuristics can comprise ignoring stopwords (e.g., short words, single letters, definite and/or indefinite articles, etc.), assigning a prespecified high weight to a first word in a title of the content item, and assigning a prespecified low weight to each additional word in the title of the content item. Additionally, past searches can be aggregated in a search log. The search log can comprise a plurality of content items and/or assets, and each of the past searches can comprise at least a search term and a selected content item. The search log can be used to determine which search terms were previously used to search for a particular content item, and a weight assigned to the terms can be increased for the content item based on a number of times a particular search was used to locate the content item. In one example, the weight assigned to the terms based on the search logs can be used in place of the prespecified weights given to search terms by the heuristics.

In an example, a popularity of a particular content item during a current time period may be determined based on one or more factors. In an example, data regarding a popularity of the content item in the past can be one factor used to determine the popularity of the content in the current time period. For example, a popularity of the content item in the past seven, six, five, four, three, two, and/or one days can be used to determine the popularity of the content item during the current time period. In some aspects, a popularity of the program at a particular time of day, time of week, or time of year, can be used to determine the popularity of the program in the current time period. For example, a number of searches for the item at a particular time of day (e.g., news programs are more popular in the evening), a number of searches for the item at a particular time of the week (e.g., a program can be more popular on the day it airs, the day after it airs, etc.), a number of searches for the item at a particular time of year (e.g., a holiday movie can be more popular in the month of December). In an example, factors that affect the popularity of the content item in the current time period can comprise one or more of whether the content item is currently airing, whether the content item is new, live, or a repeat, and a popularity of related content items (e.g., popularity of a movie trailer can affect the determination of how popular the corresponding movie will be in the current time period, popularity of other shows on a particular network can affect popularity of the network, popularity of participating teams and/or players can affect popularity of a sporting event, etc.). In some aspects, a weighted average of the factors that affect the popularity of the content item during the current time period can be used to produce the popularity of the content during the current time.

In some examples, a relevance of the content item to the user submitting the search term may be determined. In particular, a user's previous search history can be used to help return search results that are more relevant to the user's interests. For example, a total number of searches executed by the user can be determined. Separately, a number of unique content items viewed based on the searches executed by the user can be determined. Based on the number of searches and the number of unique content items viewed, a personalization score can be produced. The personalization score can be a function of the number of searches and the number of unique items viewed. As an example, if a user performs 100 searches, and views 20 unique content items based on the performed searches, a personalization score can indicate that 20 times out of 100, (e.g., 20%) the user searches for new content, while 80 times out of 100 (e.g., 80%) the user is searching for content he has already watched. Accordingly, content on the user's previously viewed list can be weighted higher than content that the user has not viewed.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content e.g., data, input programming, and the like) from multiple sources. The central location 101 can combine the content from the various sources and can distribute the content to user e.g., subscriber) locations (e.g., location 119) via a distribution system 116.

In an example, the central location 101 can receive content from a variety of sources 102a, 102b, 102c, The content can be transmitted from the source to the central location 101 via a variety of transmission paths, including wireless (e.g. satellite paths 103a, 103b) and a terrestrial path 104. The central location 101 can also receive content from a direct teed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, hid that are each associated with an input source. For example, MPEG encoders such as an encoder 112 are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an example, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an example, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network), The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

The communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

The user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an example, the user location 119 may not be fixed. By way of example, a user can receive content from the network 116 on the mobile device 124. The mobile device 124 can comprise a laptop computer, a tablet device, a computer station, a personal data assistant (FDA), a smart device (e.g., smart phone, smart apparel, smart watch, smart glasses). GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

The system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

The system 100 can comprise one or more content source (s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an example, the content can be accessed by users via applications, such as mobile applications, television applications, set-top box applications, gaining device applications, and/or the like. An example application can be a custom application (e.g., by content provider, for a specific device), a general content browser e.g., web browser), an electronic program guide, and/or the like.

The system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In one example, the methods and systems disclosed can be located within the media device 120, the display 121, the CT 122, and/or the mobile device 124. The central location 101 can facilitate access to a corpus of content items (e.g., audio and/or video content items) from the input sources 102*a,b,c*, the input source 106, the server 110, and the like. In an example, a user can transmit a query to the central location 101 using, for example, a user device such as an input device connected to one or more of the media device 120, the display 121, the CT 122, and/or the mobile device 124. The query can comprise at least a search term. In an example, the central location 101 can execute a search based on the provided search term. The central location 101 can return one or more of the content items from the corpus based on the search term. In an example, providing the one or more content items from the corpus can comprise displaying a list of the provided search terms and/or the one or more content items and facilitating consumption (e.g., viewing) of the provided content items. In an example, the central location 101 can establish an order for the one or more returned content items based on a final relevance score associated with each of the plurality of content items associated with the corpus. In an example, multiple factors can contribute to the final relevance score. For example, the final relevance score for each of the content items returned in a search can be based on how well the search term matches the content item, how popular the content item is during a current time period, and how relevant the content item is to the user submitting the search term.

How well the search term matches the content item can be determined based on one or more heuristics (e.g., rules) that specify an importance of each word in the search term. For example, the heuristics can comprise ignoring short words (e.g., "to," "at," "by," etc.), single letters, definite/indefinite articles, and the like, collectively known as "stopwords." Other example heuristics can comprise the central location 101 assigning a prespecified high weight to words in the query which match a first word of the content items and assigning a prespecified low weight to each additional word in the query which matches a word in one or more of the content items. Additionally, past searches can be aggregated at the central location 101 in a search log. The search log can comprise a plurality of searches, and each of the past searches can comprise at least a search term and a corresponding selected content item. The search log can be used to determine which search terms were previously used to search for a particular content item at the central location 101. The central location 101 can assign a weight to the term based on a number of times the term was used to find the particular content item in the search logs. In one aspect, the weight assigned to the terms based on the search logs can be used in place of the prespecified weights given to search terms by the heuristics. In other aspects, the weight assigned to the terms based on the search logs can be combined with the prespecified weights given to search terms by the heuristics as, for example, a weighted average.

In an example, the central location 101 can determine how popular a particular content item is during a current time period based on one or more factors. In an example, data regarding how popular the content item has been in the past can be used as a factor to determine the popularity of the content in the current time period. For example, a popularity of the content item in the past seven, six, five, four, three, two, and/or one days can be used as a factor to determine the popularity of the content item during the current time period. As another example, whether the content item is currently airing and/or whether the content item is new, live, or a repeat can be factors that affect the determination of how popular the content item is during the current time period. In some aspects, a popularity of related content items can also be a factor that affects the determination of how popular the content item is during the current time period. For example, a popularity of a movie trailer can affect the determination of how popular a corresponding movie will be in the current time period, a popularity of other shows on a particular network can affect a popularity of the network, popularities of participating teams and/or players can affect a popularity of a sporting event, popularities of past episodes of a television program can affect the determination of popularity of a current episode of the same program, etc. In some aspects, a weighted average of the one or more factors can be used to produce a popularity score indicating the determined popularity of the particular content at the current time.

In an example, the central location 101 can determine how relevant a content item is to the user submitting the search term. In particular, a previous search history from a user can be stored at the central location 101. The previous search history can be used to help return search results that are more relevant to the user's interests. For example, a total number of searches executed by the user can be determined. Separately, a total number of unique content items viewed based on the searches can be determined. Based on the total number of searches executed and the total number of unique content items viewed, a personalization score can be produced. The personalization score can be a function of the number of searches and the number of unique content items viewed. As an example, if a user performs 100 searches, and views 20 unique content items based on the performed searches, a personalization score can indicate that 20 times out of 100, 20%) the user searches for new content, while 80 times out of 100 (e.g., 80%) the user is searching for content he has already watched. Accordingly, the personalization score can be produced such that content on the user's previously viewed list can be weighted higher than content that has not been viewed.

In an example, the central location 101 can combine the assigned weight, the popularity information, and/or the personalization score to determine final relevance scores for each of the content items associated with the corpus, Results of the search can comprise a number of content items ordered based on the final relevance scores. In an example, a predetermined number of content items can be included in the results (e.g., ten content items can be returned). In other examples, the results can include all content items with a relevance score that exceeds a predetermined threshold. In an example, the central location 101 can display the results to the user by transmitting the results to the media device 120, the display 121, the CT 122, and/or the mobile device 124.

Figure 2:
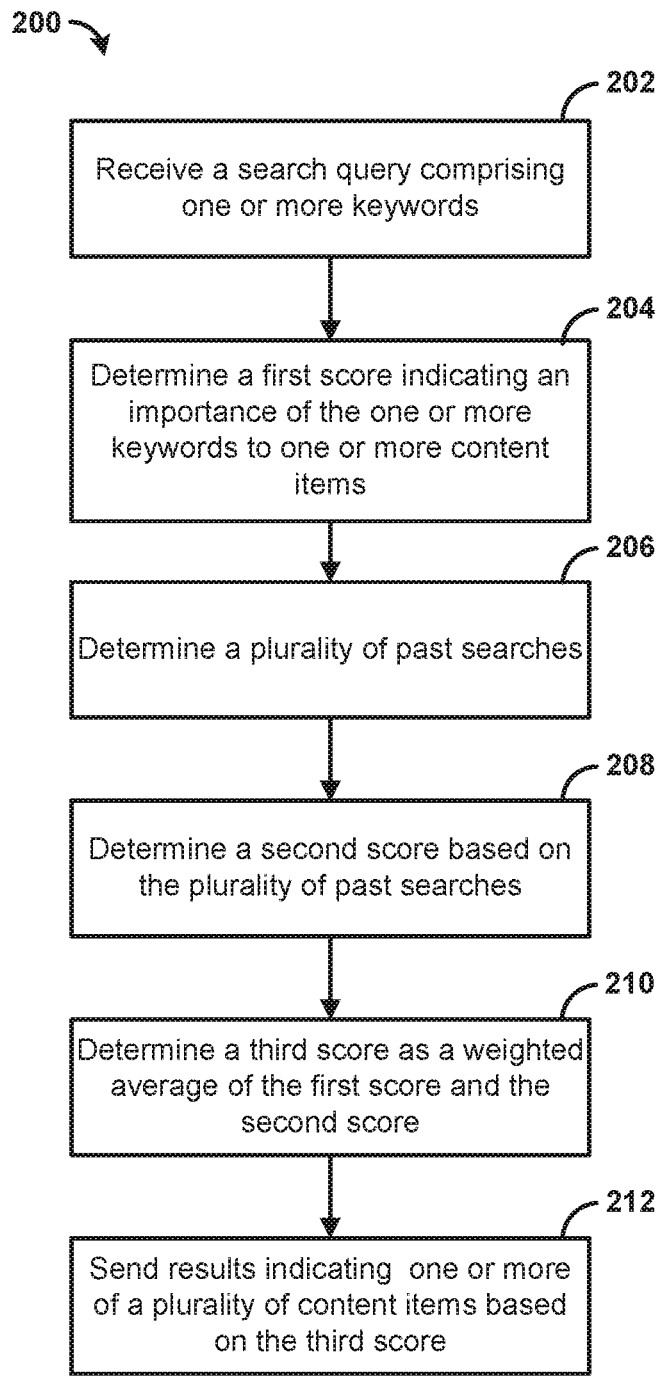
FIG. 2 is a flowchart illustrating an example method.

FIG. 2 is a flowchart illustrating an example method 200. In step 202, a server (e.g., a server at the central location 101) can receive a search query. In an example, the search query can be transmitted to the server from a user device, such as a set top box, smart television, smartphone, tablet computer, laptop computer, or the like. In an example, the search query can comprise one or more keywords (e.g., search terms). In an example, the search query can be transmitted to the server from a user device (e.g., the media device 120, the display 121, and/or the mobile device 124) or a gateway device (e.g., the CT 122). The search query can be provided by a user searching for one or more content items from a content or service provider. In an example, the search query can further comprise information regarding the user that submitted the query (e.g., a username or other identifying information).

In step 204, a first score indicating an importance of a search term to one or more (e.g., each) of a plurality of content items associated with a corpus can be determined. For example, the server can determine the first score. Alternatively, one or more of the media device 120, the display 121, the CT 122, and/or the mobile device 124 can determine the first score. In some aspects, one or more heuristics can be used to determine the first score based on a difference between titles associated with the one or more content items and the one or more keywords. In an example, the one or more heuristics can be applied by the server based on the received search query. In an example, the heuristics can include, for example, ignoring short words (e.g., "to," "at," "by," etc.), single letters, definite/indefinite articles, and the like, collectively known as "stopwords," assigning a prespecified high weight to words that matched a first word in a title of the content items associated with the corpus, and assigning a prespecified low weight to each additional word. For each content item associated with the corpus, the first score can be determined based on the weights of the words in the search term and whether or not each of the words is present in the content item.

In step 206, the server can determine e.g., receive, access, etc.) a plurality of past searches. In some aspects, the past searches received by the server can comprise searches performed by the user during a specified time period preceding a current time e.g., searches performed in the past day, week, month, year, etc.). In some aspects, the server can receive the plurality of past searches from a data storage device in communication with the server and one or more user devices. In an example, each of the plurality of past searches can comprise at least a search query comprising one or more keywords and a selected result (e.g., the content item selected by the user that performed the search). In some aspects, the plurality of past searches can be stored on the server and retrieved from memory. In other aspects, the plurality of past searches can be stored remotely (e.g., at a data center in communication with the server), and transmitted to the server in response to a request for past search data.

In step 208, the server can determine a second score for the one or more (e.g., each) of the plurality of content items associated with the corpus. In some aspects, the second score can be determined for the one or more of the plurality of content items associated with the corpus, regardless of whether or not a first score was computed for the content item. In other aspects, the second score can be determined for only the one or more content items associated with the corpus for which a first score was computed. In an example, the second score for each of the plurality of content items associated with the corpus can be determined based on whether a previous search (e.g., a search by any user) was used to locate the content item. In an example, the second score can indicate an importance of the search term to one or more of the plurality of content items associated with the corpus based on the plurality of past searches. In particular, the second score can comprise an indication of how often a particular content item associated with the corpus is an object of a search.

In step 210, the server can determine, for the one or more (e.g., each) of the plurality of content items associated with the corpus, a third score that can indicate the overall relevance of the content item to the search term. In some aspects, the third score can be determined for the one or more of the plurality of content items associated with the corpus, regardless of whether or not a first score and/or a second score was computed for the content item. In other aspects, the third score can be determined for only the one or more content items associated with the corpus for Which a first score was computed, and/or for only the one or more content items in the corpus for which a first score and a second score were computed. In an example, the third score can be based on one or more of the first score and the second score. For example, the third score can be determined by taking a weighted average of the first score and the second score. In some examples, a machine learning algorithm can be used to determine the weights applied to the first score and the second score. For example, a classifier can be used to determine weights for the first score and the second score. In an example, the third score can indicate a relevance of the content item to the search query.

In some examples, the third score for each of the content items can be adjusted based on the received information related to the user submitting the search query. As an example, information related to the user's previous searches can be used to adjust the third score. As a particular example, if a particular user repeatedly searches for and views a particular content item, the third score for that particular content item can be increased based on the user's previously searched and viewed content items. As another example, if a particular content item is repeatedly returned in a user's search result and has never been viewed by the user, the third score for that particular content item can be decreased.

In some examples, the third score of each content item can be adjusted based on a popularity of the content item. The popularity of one or more (e.g., each) of the plurality of content items associated with the corpus can be determined. In an example, the popularity can be a popularity during a current time period. The popularity can be determined based on one or more factors. The factors used to determine popularity can comprise a number of searches for the item within a predetermined time period (e.g., a number of searches for the content within the past week, six days, five days, four days, three days, two days, and/or one day), a number of searches for the item at a particular time of day (e.g., news programs are more popular in the evening), a number of searches for the item at a particular time of the week (e.g., a program can be more popular on the day it airs, the day after it airs, etc.), a number of searches for the item at a particular time of year e.g., a holiday movie can be more popular in the month of December), whether or not the program is new, and popularity of related items. For example, the popularity of a particular content item can be affected by popularities of related content items. For example, a popularity of a sporting event can be affected by popularities of the teams participating in the sporting event, a popularity of a movie can be affected by popularities of movie trailers, and a popularity of a new show can be affected by the popularities of past shows that aired on the same network and/or in the same time slot. In an example, the relevance score is altered based on the determined popularity. In an example, when more than one factor is used to determine the popularity, the popularity can be determined using a weighted average of the factors.

In step 212, the server can send (e.g., return, display, provide, etc.) one or more results to the user device. In an example, returning the one or more results can comprise displaying a representation of the one or more of the plurality of items to a user based on the relevance score of the items. For example, the representation can comprise an image representing the content item, a title of the content item, a thumbnail representing the content item, and combinations thereof. In some examples, the one or more results can comprise a predetermined number of results (e.g., ten results). In some aspects, the one or more results can comprise results having a third score greater than a predefined number.

In some aspects, the one or more results returned can be ordered according to their associated third score. That is, results having a higher third score (e.g., results that are more relevant) can be returned before results that have a lower third score.

In some examples, the server can receive a selection of one of the one or more of the plurality of content items from the user device. In response to receiving the selection, the server can transmit the selected content item to the user device. For example, the selected content item can be transmitted as streaming content, as video on demand content, as a download for display by the user device, and/or the like.

In some examples, the server and/or the user device can store one or more of the search results returned by the server in step 212 and the selected content item as a past search. In some examples, the past search can be incorporated into a search log.

Figure 3:
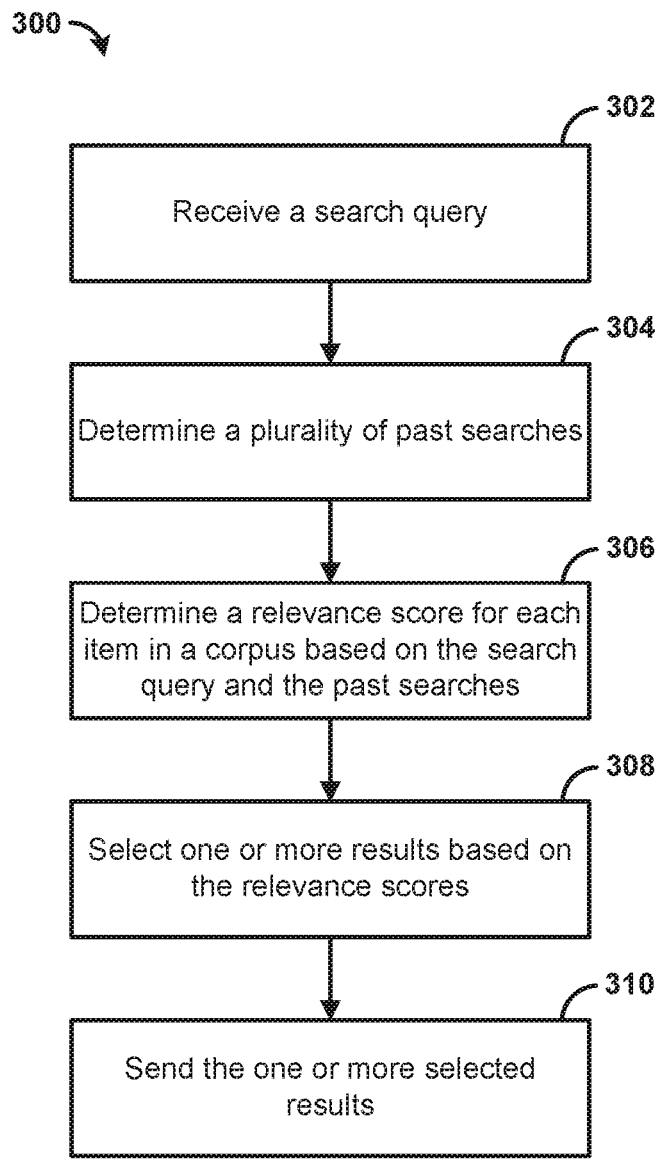
FIG. 3 is a flowchart illustrating an example method.

FIG. 3 is a flowchart illustrating an example method 300. In step 302, a server e.g., a server at the central location 101) can receive a search query. In an example, the search query can comprise one or more keywords (e.g., search terms). In an example, the search query can be transmitted to the server from a user device (e.g., the media device 120, the display 121, and/or the mobile device 124) or a gateway device e.g., the CT 122). The search query can be provided by a user searching for one or more content items from a content or service provider. In an example, the search query can further comprise information regarding the user that submitted the query (e.g., a username or other identifying information).

In step 304, the server can determine (e.g., receive, access, etc.) a plurality of past searches. In some examples, one or more (e.g., each) of the past searches can include a search term and an associated selected item. In some examples, the received plurality of past searches can comprise searches performed by the user during a specified time period (e.g., searches performed in the past, day, week, month, year, etc.). The received plurality of past searches can further comprise searches performed by one or more other users. In some examples, the server can receive the plurality of past searches from a data source n communication with the server and one or more user devices. In an example, each of the plurality of past searches can comprise at least a search query comprising one or more keywords and a selected result (e.g., the content item selected by the user that performed the search). In some examples, the plurality of past searches can be stored on the server and retrieved from memory. In other aspects, the plurality of past searches can be stored remotely (e.g., at a data center in communication with the server), and transmitted to the server in response to a request for past search data.

In step 306, the server can determine a relevance score for one or more (e.g., each) of the content items associated with the corpus. In an example, the relevance score for the one or more of the plurality of content items associated with the corpus can be determined based on whether a previous search (e.g., a search by any user in the received plurality of past searches was used to locate the content item. In an example, the relevance score can indicate an importance of the search term to one or more of the plurality of content items associated with the corpus based on the plurality of past searches. In particular, the relevance score can comprise an indication of how often a particular content item associated with the corpus is an object of a search.

In some examples, the relevance score for each of the content items can be adjusted based on the received information related to the user submitting the search query. As an example, information related to the user's previous searches can be used to adjust the relevance score. As a particular example, if a particular user repeatedly searches for and views a particular content item, the relevance score for that particular content item can be increased based on the user's previously searched and viewed content items. A user's previous search history can be used to help return search results that are more relevant to the user's interests. For example, a total number of searches executed by the user can be determined. Separately, a total number of unique content items viewed based on the searches can be determined. Based on the number of searches and the number of unique content items viewed, a personalization score can be produced. The personalization score can be a function of the number of searches and the number of unique content items viewed. As an example, if a user performs 100 searches, and views 20 unique content items based on the performed searches, a personalization score can indicate that 20 time out of 100, (e.g., 20%) the user searches for new content, while 80 times out of 100 (e.g., 80%) the user is searching for content he has already watched. Accordingly, content on the user's previously viewed list can be weighted higher than content that has not been viewed.

In some examples, the relevance score of each content item can be adjusted based on a popularity of the content item. The popularity of one or more (e.g., each) of the plurality of content items associated with the corpus can be determined by one or more of the server and the user device. In an example, the popularity can be a popularity during a current time period. The popularity can be determined based on one or more factors. Factors used to determine popularity can comprise, for example, a number of searches for the item within a predetermined time period (e.g., a number of searches for the content within the past week, six days, five days, four days, three days, two days, and/or one day), a number of searches for the item at a particular time of day (e.g., news programs are more popular in the evening), a number of searches for the item at a particular time of the week (e.g., a program can be more popular on the day it airs, the day after it airs, etc.), a number of searches for the item at a particular time of year (e.g., a holiday movie can be more popular in the month of December), whether or not the program is new, and popularity of related items. For example, a popularity of a sporting event can be affected by popularities of the teams participating in the sporting event can be affected by popularities of teams competing in the event, a popularity of a new movie can be affected by popularities of trailers for the new movie, a popularity of a new show can be affected by the popularities of past shows that aired on the same network and/or in the same time slot, and a popularity of a new episode of an established show can be affected by popularities of past episodes of the established show. In an example, the relevance score is altered based on the determined popularity. In an example, when more than one factor is used to determine the popularity, the popularity can be determined using a weighted average of the factors.

In step 308, the server can select one or more results to be returned to the user device. In an example, the one or more results can be selected based on the relevance scores of the plurality of content items, in some aspects, the one or more results can be selected based on a predefined relevance score (e.g., all results exceeding the predefined relevance score are selected). In some aspects, a predetermined number of content items can be selected as the one or more results, based on their associated relevance scores (e.g., the ten content items having the highest associated relevance score are selected as the results). In an example, the one or more results can be ordered based on their respective relevance scores.

In step 310, the server can send (e.g., return, display, provide, etc.) the one or more results selected in step 308. In an example, returning the one or more results can comprise displaying a representation of one or more of the plurality of items on the user device based on the relevance score of the items. For example, the representation can comprise an image representing the content item, a title of the content item, a thumbnail representing the content item, and combinations thereof.

In some examples, the server can receive a selection of one of the one or more of the plurality of content items from the user device. In response to receiving the selection, the server can transmit the selected content item to the user device. For example, the selected content item can be transmitted as streaming content, as video on demand content, as a download for display by the user device, and/or the like.

In some examples, the server and/or the user device can store one or more of the search results returned by the server in step 212 and the selected content item as a past search. In some examples, the past search can be incorporated into a search log.

Figure 4:
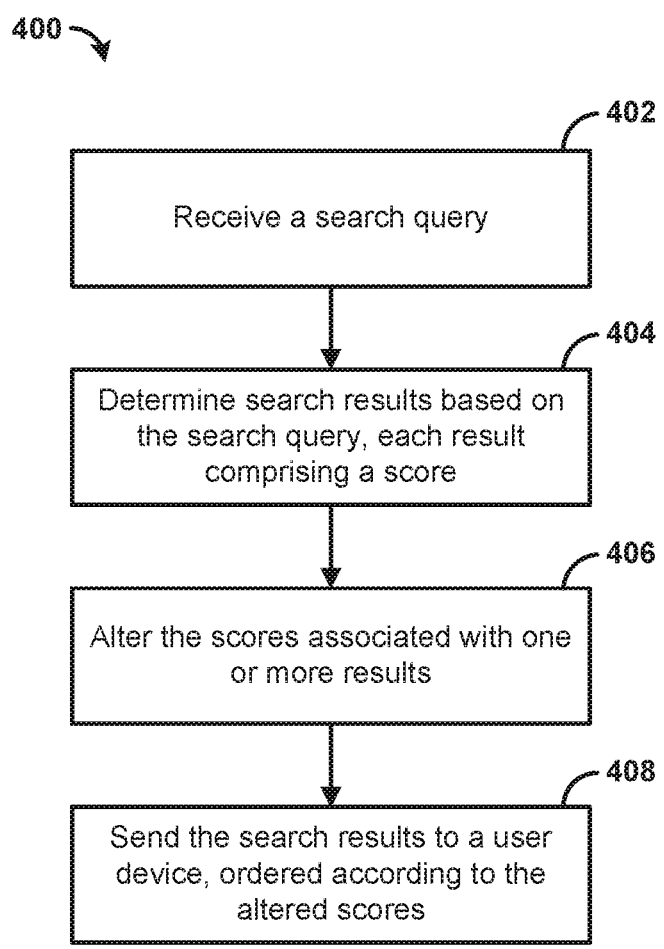
FIG. 4 is a flowchart illustrating an example method.

FIG. 4 is a flowchart illustrating an example method 400. In step 402, a server e.g., a server at the central location 101), managing access to a corpus comprising a plurality of content items, can receive a search query. In an example, the search query can comprise one or more keywords (e.g., search terms) and information regarding the user that submitted the query (e.g., a username or other identifying information). In an example, the search query can be transmitted to the server from a user device (e.g., the media device 120, the display 121, and/or the mobile device 124) or a gateway device (e.g., the CT 122). The search query can be provided by a user searching for one or more content items from a content or service provider.

In step 404, the server can determine one or more search results based on the one or more search terms. In an example, the search query can be used to query a corpus comprising a plurality of content items, and each of the one or more search results can comprise one content item. In some examples, each search result can comprise a content item (e.g., one of the plurality of content items associated with the corpus) and an associated relevance score.

In some aspects, one or more (e.g., each) of the search results can be determined. For example, the server can determine the one or more search results. Alternatively, the user device can determine the search results. In some aspects, the search results can be determined, in whole or in part, based on one or more heuristics. For example, one or more heuristics can be applied to determine a first score indicating importance of a search term to one or more of a plurality of content items associated with a corpus. In an example, the one or more heuristics can be applied by the server based on the received search query. In an example, the heuristics can include, for example, ignoring short words (e.g., "to," "at," "by," etc.), single letters, definite/indefinite articles, and the like, collectively known as "stopwords," assigning a prespecified high weight to words that match a first word in the search term and assigning a prespecified low weight to words that match each additional word in the search term. For each content item associated with the corpus, the relevance score can be determined based on the weights of the words in the search term and whether or not each of the words is present in the content item.

In some examples, the server can determine a relevance score for each of the content items associated with the corpus based on, in whole or in part, whether one or more previous searches were used to locate the content item, and the similarity between the previous search and the search query. The server can receive a plurality of past searches from, for example, a data storage device in communication with the server and one or more user devices. In some examples, the plurality of past searches can comprise searches performed during a predefined time period (e.g., the last day, week, month, year, etc.). Each of the plurality of past searches can comprise at least a search query comprising one or more keywords and a selected result (e.g., the content item selected by the user that performed the search). In an example, the relevance score can indicate an importance of the search term to one or more of the plurality of content items associated with the corpus based on the plurality of past searches. As an example, when a particular search term is often used to find a particular content item, the relevance score for that content item and search term can be relatively high.

In some examples, the relevance score of each content item can be adjusted based on a popularity of the content item. The popularity of one or more (e.g., each) of the plurality of content items associated with the corpus can be determined. In an example, the popularity can be a popularity during a current time period. The popularity during the current time period can be determined based on one or more factors. For example, the factors used to determine popularity during the current time period can comprise a number of searches for the item within a predetermined time period (e.g., a number of searches for the content within the past week, six days, five days, four days, three days, two days, and/or one day), a number of searches for the item at a particular time of day (e.g., news programs are more popular in the evening), a number of searches for the item at a particular time of the week (e.g., a program can be more popular on the day it airs, the day after it airs, etc.), a number of searches for the item at a particular time of year (e.g., a holiday movie can be more popular in the month of December), whether or not the program is new, popularity of related items, and combinations thereof. As examples, a popularity of a sporting event can be affected by popularities of the teams participating in the sporting event, a popularity of a movie can be affected by popularities of movie trailers for that movie, and a popularity of a new show can be affected by the popularities of past shows that aired on the same network and/or in the same time slot. In an example, the relevance score can be altered based on the determined popularity. In an example, when more than one factor is used to determine the popularity, the popularity can be determined using a weighted average of the factors.

In step 406, the server can alter the relevance score associated with at least one of the one or more search results based on the information related to a user submitting the search query. In an example, the server can determine how relevant a content item is to the user submitting the search term. In particular, the server can retrieve a user's previous search history. The previous search history can be used to help return search results that are more relevant to the user's interests. For example, a total number of searches executed by the user can be determined. Separately, a total number of unique content items viewed based on the searches can be determined. Based on the number of searches and the number of unique content items viewed, a personalization score can be produced. The personalization score can be a function of the number of searches and the number of unique content items viewed. As an example, if a user performs 100 searches, and views 20 unique content items based on the performed searches, a personalization score can indicate 0 times out of 100 (e.g., 80%) the user is searching for content he has already watched. Accordingly, content items on the user's previously viewed list can be weighted higher than content that the user has not viewed. The personalization score assigned to the content items associated with the corpus can be used to adjust the relevance scores assigned in step 404. For example, the personalization score and the relevance score can be combined using an average or weighted average.

In step 408, the server can send (e.g., return, display, provide, etc.) one or more results to the user device. In an example, returning the one or more results can comprise displaying a representation of one or more of the plurality of items to a user based on the relevance score of the items. For example, the representation can comprise an image representing the content item, a title of the content item, a thumbnail representing the content item, and combinations thereof. In some aspects, the one or more results can comprise a predetermined number of results (e.g., ten results). In some aspects, the one or more results can comprise results having a relevance score that exceeds a predefined threshold. In some examples, the one or more results returned can be ordered according to their associated relevance score. That is, results having a higher relevance score (e.g., results that are more relevant) can be ranked higher than results that have a lower relevance score.

In some examples, the server can receive a selection of one of the one or more of the plurality of content items from the user device. In response to receiving the selection, the server can transmit the selected content item to the user device. For example, the selected content item can be transmitted as streaming content, as video on demand content, as a download for display by the user device, and/or the like.

In some examples, the server and/or the user device can store one or more of the search results returned by the server in step 212 and the selected content item as a past search. In some examples, the past search can be incorporated into a search log.

Figure 5:
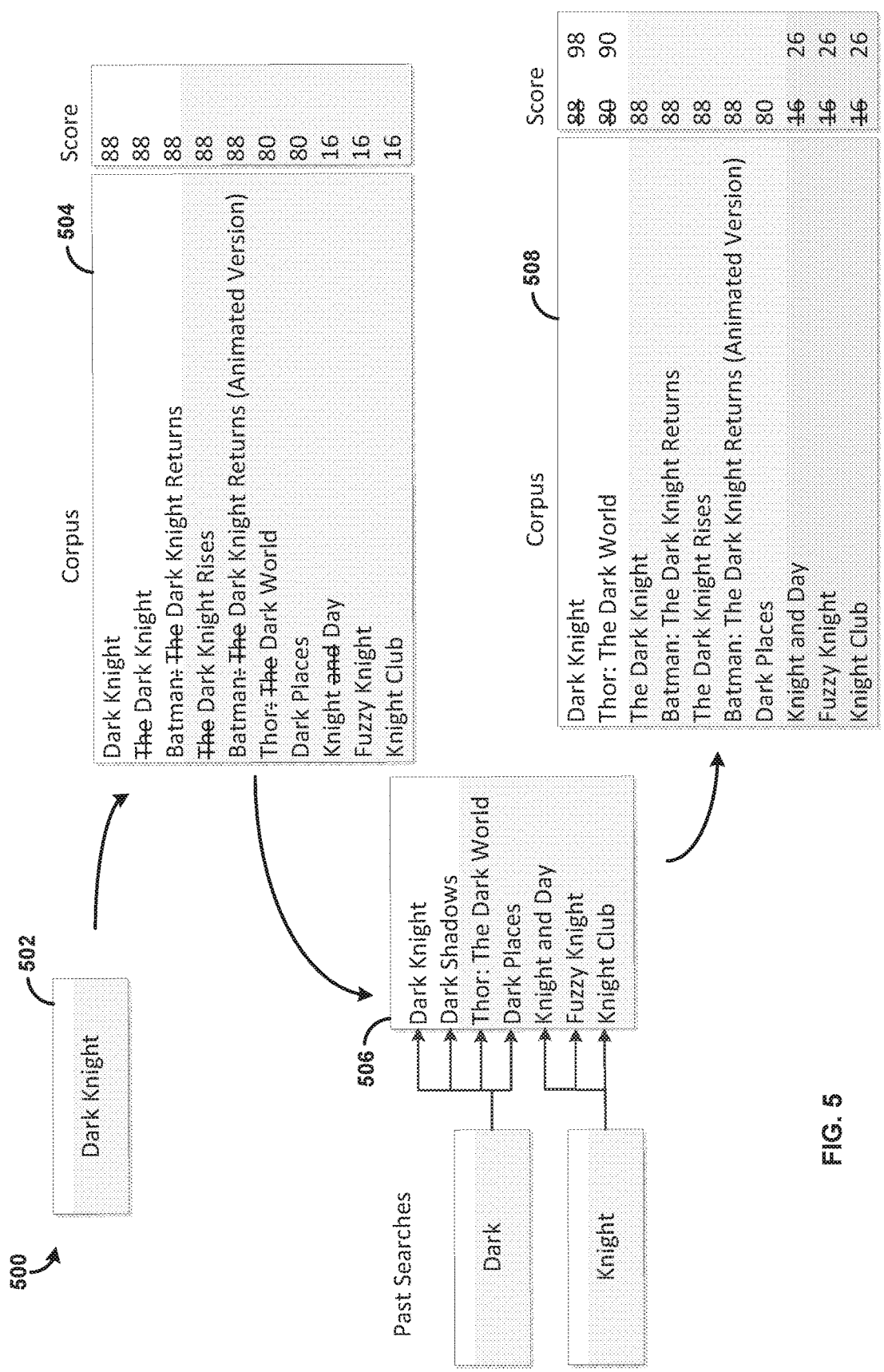
FIG. 5 illustrates an application of the example methods.

FIG. 5 shows an example of a search query 500. At 502, a server can receive a search query from a user device. The search query can contain one or more keywords. As shown in FIG. 5, the search query comprises the keywords "dark" and "knight." At 504, one or more titles associated with one or more (e.g., each) of the items associated with a corpus receives a first score based on heuristics. For example, heuristics can be applied to the content items associated with the corpus, including ignoring stopwords, assigning a pre-specified very high score (e.g., 88 points) for matching all keywords in the search query, assigning a prespecified high score (e.g., 80 points) for matching a first keyword, assigning a prespecified low score (e.g., 16 points) to matching other keywords. As a specific example the content item having a title "Dark Knight" associated therewith receives a score of 88 points (e.g., all keywords are matched), the content item "Dark Places" receives a score of 80 points (e.g., the first keyword is matched) and the content item "Knight and Day" receives a score of 16 (e.g., the second keyword is matched).

At 506, one or more past search results associated with the keywords from the search query are retrieved. As shown, at 506, past search results related to the keyword "dark" and/or the keyword "knight" are retrieved. The arrows, at 506 indicate items of the corpus selected by the user based on the search keywords. At 508, the scores received in step 504 can be modified based on the retrieved past search results. For example, as shown in 508, content items associated with the corpus that were selected in a past search can have associated scores modified by increasing the score by 10 points. As a specific example, the content item "Dark Knight" receives a modified score of 98 because it was selected in a past search (e.g., a search for "Dark" as shown in 506), while the score for the content item "Batman: The Dark Knight Returns" is not modified, since that content item was not selected in a past search. The content items associated with the corpus can be reordered according to the modified scores. For example, the content items at 508 are reordered by score, with the highest score at the top of the list and the lowest scores at the bottom of the list. The server can provide the search result to the user device.

Figure 6:
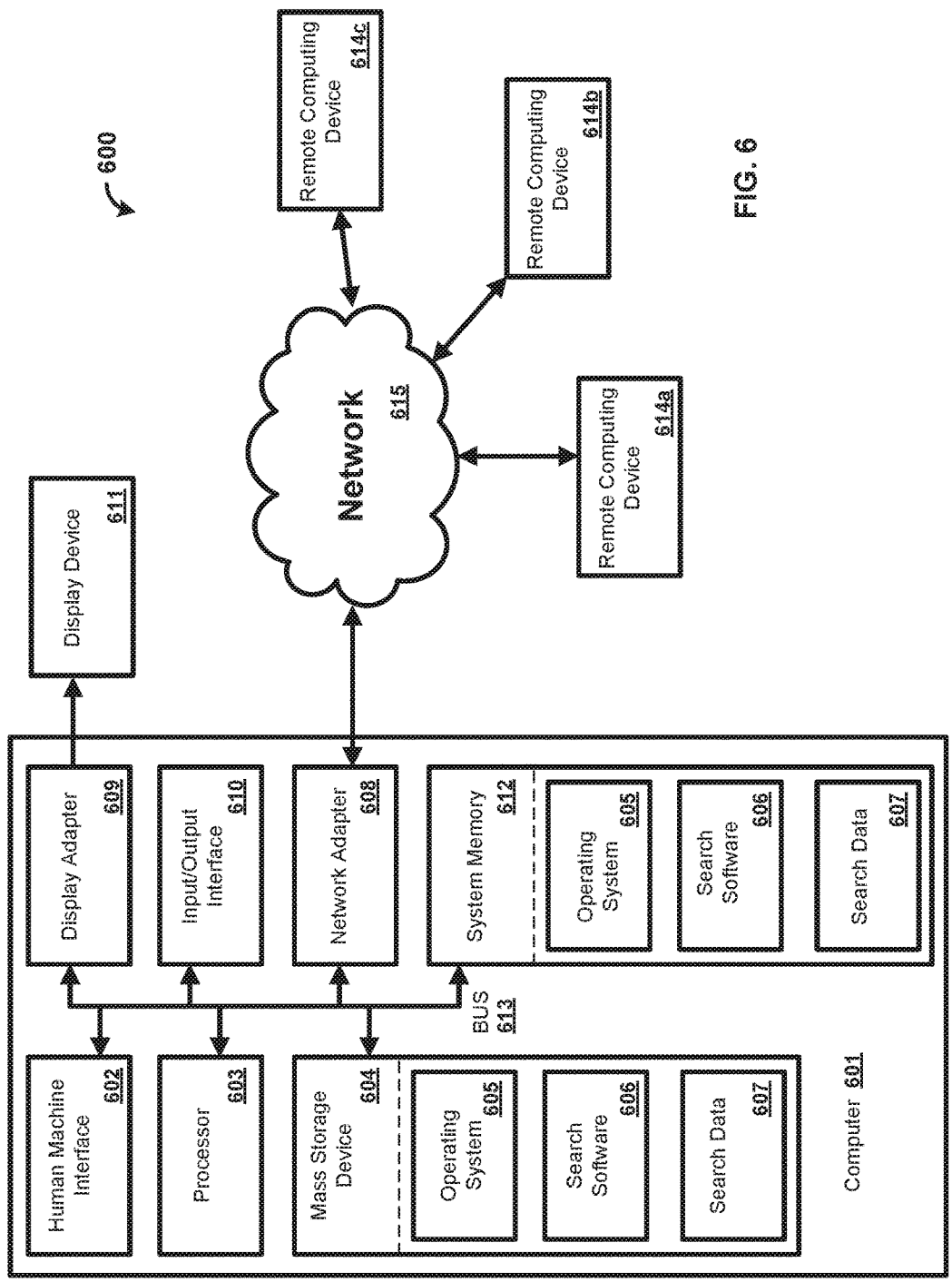
FIG. 6 is a block diagram illustrating an example computing device.

In an exemplary aspect, the methods and systems can be implemented on a computer 601 as illustrated in FIG. 6 and described below, By way of example, central location 101 of FIG. 1 can comprise a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 613, and all buses specified in this description can also be implemented over a wired or wireless network connection and each of the subsystems, including the one or more processors 603, a mass storage device 604, an operating system 605, search software 606, search data 607, a network adapter 608, the system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computer 601 typically comprises a variety of computer readable media.

Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the search data 607 and/or program modules such as the operating system 605 and the search software 606 that are immediately accessible to and/or are presently operated on by the one or more processors 603.

In another example, the computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (MID) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the search software 606. Each of the operating system 605 and the search software 606 (or some combination thereof) can comprise elements of the programming and the search software 606. The search data 607 can also be stored on the mass storage device 604. The search data 607 can be stored in any of one or more databases known in the art. Examples of such databases comprise, DB2®, Microsoft® Access, Microsoft® SQL Server, Oracle®, mySQL PostgreSQL and the like. The databases can be centralized or distributed across multiple systems.

In another example, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another example, the display device 611 can also be connected to the system bus 613 via an interface, such as the display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via the Input/Output interface 610, Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 6141*a,b,c*. By way of example, a remote computing device can be a personal computer, portable computer, smartphone, a server, a router, a network computer, a peer device or other common network node, and so on. Logical connections between the computer 601 and a remote computing device 614*a,b,c* can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the search software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

receiving, from a user device by a system comprising a server in communication with the user device, a search query comprising a search term and information identifying the user device;

determining, by the system and based on the information identifying the user device, a first plurality of previous search queries requested by the user device that include the search term of the search query;

determining, by the system and based on each selected content item, of a plurality of content items, selected by the user device for each previous search query of the first plurality of previous search queries and based on a quantity of times that the each selected content item was selected by the user device in the first plurality of previous search queries, relevance information for each content item;

determining, by the system and based on the relevance information and the search term, one or more content items of the plurality of content items; and sending, by the system, the relevance information to the user device to facilitate the user device outputting a listing of at least a portion of the one or more content items.

2. The method of claim 1, further comprising:
determining a number of unique content items of the each selected content item selected by the user device based on:
the first plurality of previous search queries, requested by the user device, that include the search term; and
a second plurality of previous search queries, requested by the user device, that do not include the search term; and
adjusting, based on the number of unique content items of the each selected content item, the relevance information for the each selected content item, wherein the plurality of content items comprises the unique content items.

3. The method of claim 1, further comprising determining a popularity of the one or more content items of the plurality of content items, wherein the relevance information of the one or more content items is adjusted based on the determined popularity.

4. The method of claim 3, wherein determining the popularity of the one or more content items is based on one or more factors and wherein the one or more factors comprise one or more of: search queries for the one or more content items within a predetermined time period, whether or not the one or more content items are new, or popularity data associated with items related to the one or more content items.

5. The method of claim 4, wherein determining the popularity of the one or more content items is further based on a weighted average of the one or more factors.

6. The method of claim 1, wherein the relevance information comprises a plurality of relevance scores, wherein each relevance score of the plurality of relevance scores is associated with a corresponding content item of the plurality of content items.

7. A method comprising:
receiving, from a user device by a system comprising a server in communication with the user device, a search query comprising one or more search terms and information associated with the user device;
determining, by the system and based on a comparison of the one or more search terms to one or more words of a title for each content item of a plurality of content items, one or more search results, wherein each search result comprises a content item of the plurality of content items and an associated relevance information that indicates a relevance of the one or more search terms to the title of an associated content item of the plurality of content items;
determining, by the system and based on the information associated with the user device, a plurality of prior search queries requested by the user device and each selected content item, of the plurality of content items, previously selected by the user device from each search result of each prior search query of the plurality of prior search queries;
altering, by the system and based on the plurality of prior search queries requested by the user device and the each selected content item, of the plurality of content items, previously selected by the user device, the associated relevance information of the associated content item of at least one of the one or more search results; and
sending, by the system and to the user device, the altered associated relevance information to facilitate the user device outputting a listing of the one or more search results, wherein the listing is organized based on the altered associated relevance information.

8. The method of claim 7, wherein the plurality of prior search queries indicates a quantity of the plurality of prior search queries that the user device has submitted comprising one or more of the one or more search terms and a total quantity of the plurality of prior search queries that the user device has submitted.

9. The method of claim 7, further comprising determining a popularity of one or more content items of the plurality of content items, wherein the associated relevance information of at least one of the one or more search results is adjusted based on the popularity of the one or more content items.

10. The method of claim 9, wherein determining the popularity of the one or more content items is based on one or more factors and wherein the one or more factors comprise one or more of: search queries for the one or more content items within a predetermined time period, whether or not the one or more content items are new, or popularity data associated with content items related to the one or more content items.

11. The method of claim 10, wherein determining the popularity of the one or more content items is further based on a weighted average of the one or more factors.

12. The method of claim 7, wherein the associated relevance information comprises a relevance score indicating the relevance of the one or more search terms to the title of the associated content item.

* * * * *